United States Patent
Takahashi et al.

(10) Patent No.: US 12,214,823 B2
(45) Date of Patent: Feb. 4, 2025

(54) VEHICLE CONTROL DEVICE, VEHICLE CONTROL METHOD, AND NON-TRANSITORY STORAGE MEDIUM

(71) Applicant: TOYOTA JIDOSHA KABUSHIKI KAISHA, Toyota (JP)

(72) Inventors: Kentaro Takahashi, Susono (JP); Naoyuki Muramatsu, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 231 days.

(21) Appl. No.: 17/978,510

(22) Filed: Nov. 1, 2022

(65) Prior Publication Data

US 2023/0192190 A1 Jun. 22, 2023

(30) Foreign Application Priority Data

Dec. 22, 2021 (JP) ................. 2021-208800

(51) Int. Cl.
- *B62D 15/02* (2006.01)
- *B60W 30/09* (2012.01)
- *B60W 30/095* (2012.01)

(52) U.S. Cl.
CPC ............... *B62D 15/0255* (2013.01)

(58) Field of Classification Search
CPC ...... B62D 15/0255; B60W 2554/4041; B60W 2554/4043; B60W 2554/4045; B60W 2554/801; B60W 2554/803; B60W 50/0098; B60W 30/12; B60W 30/09; B60W 30/0956

See application file for complete search history.

(56) References Cited

U.S. PATENT DOCUMENTS

| | | | | |
|---|---|---|---|---|
| 2005/0228588 A1* | 10/2005 | Braeuchle | ......... | B60W 50/0097 701/301 |
| 2011/0137488 A1* | 6/2011 | Sakugawa | ......... | B60W 50/0097 701/1 |
| 2019/0217883 A1* | 7/2019 | Ozawa | ................... | B62D 6/002 |
| 2020/0317199 A1* | 10/2020 | Berghöfer | ............. | B60W 30/09 |
| 2021/0024059 A1* | 1/2021 | Miyamoto | .......... | B60W 10/184 |

FOREIGN PATENT DOCUMENTS

| | | |
|---|---|---|
| DE | 102020003667 A1 | 9/2020 |
| JP | 2001-048036 A | 2/2001 |
| JP | 2019-123402 A | 7/2019 |
| WO | 2010-122639 A1 | 10/2010 |

\* cited by examiner

*Primary Examiner* — Sizo B Vilakazi
(74) *Attorney, Agent, or Firm* — Dinsmore & Shohl LLP

(57) ABSTRACT

A vehicle control device includes a processor. The processor is configured to: detect a mobile body located in a region that is not a host vehicle lane in which a host vehicle is traveling, out of regions that are adjacent to an adjacent lane that is adjacent to the host vehicle lane; detect entry operation of the mobile body to enter the adjacent lane; and when the processor detects the entry operation, perform steering control for the host vehicle such that a travel position of the host vehicle within the host vehicle lane in a width direction of the host vehicle lane is moved in a direction away from the adjacent lane before the entry operation is completed.

15 Claims, 12 Drawing Sheets

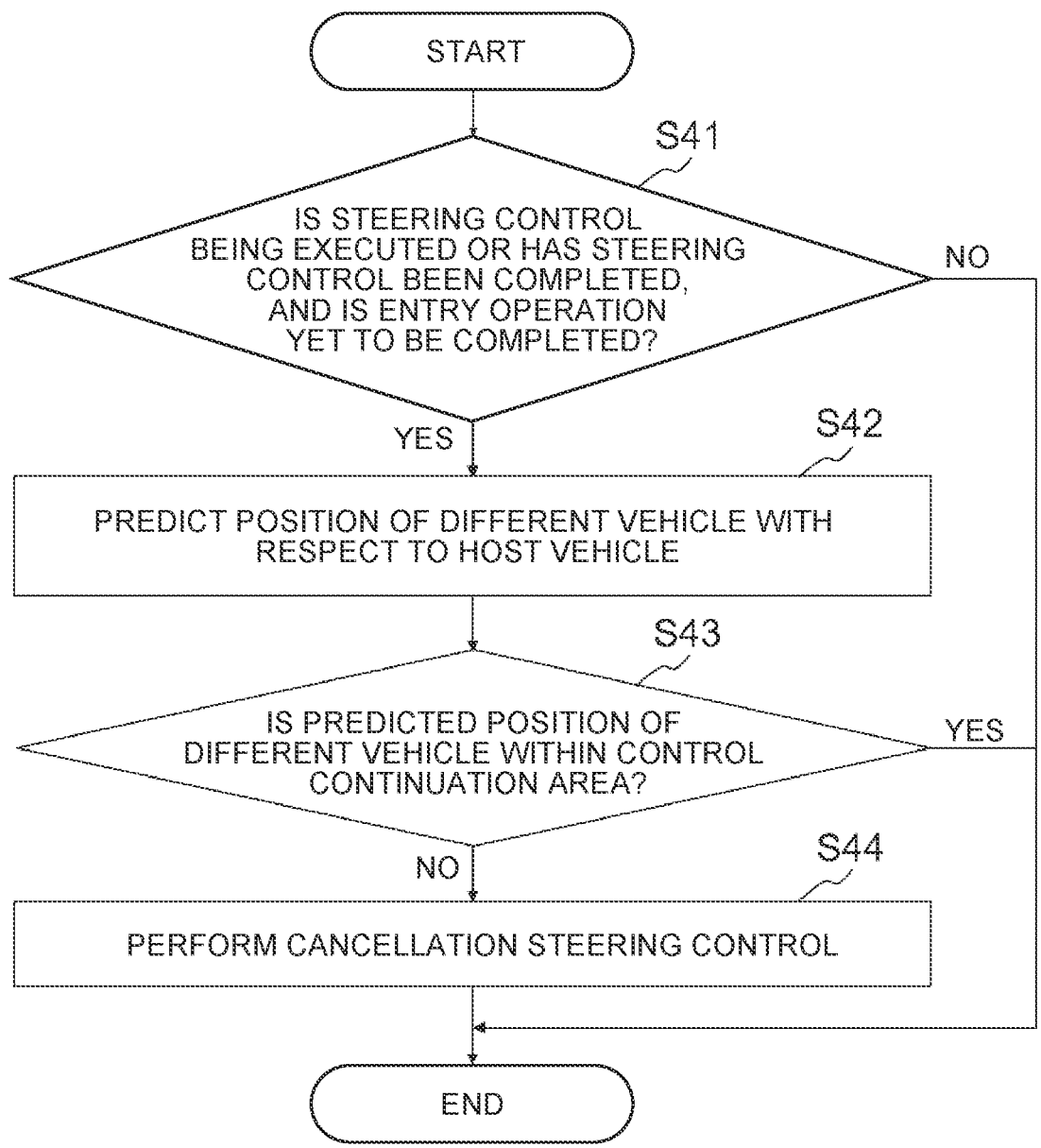

VEHICLE CONTROL DEVICE, VEHICLE CONTROL METHOD, AND NON-TRANSITORY STORAGE MEDIUM

CROSS-REFERENCE TO RELATED APPLICATION

This application claims priority to Japanese Patent Application No. 2021-208800 filed on Dec. 22, 2021, incorporated herein by reference in its entirety.

BACKGROUND

1. Technical Field

The present disclosure relates to a vehicle control device, a vehicle control method, and a non-transitory storage medium.

2. Description of Related Art

Japanese Unexamined Patent Application Publication No. 2001-48036 (JP 2001-48036 A) discloses a lane following device that causes a host vehicle to follow a lane ahead, the lane following device correcting a target travel trajectory for the host vehicle in a direction opposite a vehicle ahead traveling in an adjacent lane when such a vehicle ahead is detected. Japanese Unexamined Patent Application Publication No. 2019-123402 (JP 2019-123402 A) discloses a technique of generating a target travel trajectory that allows a host vehicle to move sideways, in a lane in which the host vehicle is traveling, away from an adjacent vehicle ahead, traveling in an adjacent lane, when such an adjacent vehicle ahead is detected and predicted to travel closer toward the host vehicle.

SUMMARY

The technologies described in JP 2001-48036 A and JP 2019-123402 A do not take into account the case where a different vehicle located in a region that is not a host vehicle lane of regions that are adjacent to an adjacent lane that is adjacent to the host vehicle lane (that is, one of two regions that are adjacent to an adjacent lane, the one being on the opposite side of the host vehicle lane), enters the adjacent lane. Examples of such a case include a case where a different vehicle traveling in a lane (hereinafter "second adjacent lane") that is adjacent to an adjacent lane and that is on the opposite side of the host vehicle makes a lane change to the adjacent lane. The technologies described in JP 2001-48036 A and JP 2019-123402 A are intended to perform control for a vehicle in an adjacent lane, and therefore start control so as to move the host vehicle away from the adjacent lane after a vehicle in a second adjacent lane enters the adjacent lane. Thus, the timing to start the control may be late for occupants of the host vehicle, and the technologies may not be able to sufficiently suppress a sense of insecurity.

The present disclosure provides a vehicle control device, a vehicle control method, and a non-transitory storage medium capable of performing control so as to move a host vehicle away from an adjacent lane at an early timing when a mobile body located in a region that is not a host vehicle lane, of regions that are adjacent to an adjacent lane that is adjacent to the host vehicle lane, is performing entry operation to enter the adjacent lane.

A first aspect of the present disclosure provides a vehicle control device including a processor. The processor is configured to detect a mobile body located in a region that is not a host vehicle lane in which a host vehicle is traveling, out of regions that are adjacent to an adjacent lane that is adjacent to the host vehicle lane. The processor is configured to detect entry operation of the mobile body to enter the adjacent lane. When the processor detects the entry operation, the processor is configured to perform steering control for the host vehicle such that a travel position of the host vehicle within the host vehicle lane in a width direction of the host vehicle lane is moved in a direction away from the adjacent lane before the entry operation is completed.

With the vehicle control device according to the first aspect of the present disclosure, a mobile body located in a region that is not a host vehicle lane in which the host vehicle lane is traveling, of regions that are adjacent to an adjacent lane that is adjacent to the host vehicle lane, is detected. When entry operation of the mobile body to enter the adjacent lane is detected, steering control is performed such that the host vehicle is moved away from the adjacent lane before the entry operation is completed. Thus, control for moving the host vehicle away from the adjacent lane can be performed at the timing before the mobile body completes the entry operation. Thus, it is possible to effectively suppress the sense of insecurity of occupants of the host vehicle.

In the vehicle control device according to the first aspect of the present disclosure, the region that is not the host vehicle lane may be a lane that is adjacent to the adjacent lane.

With the vehicle control device according to the first aspect of the present disclosure, it is possible to detect the entry operation of the mobile body in the second adjacent lane for the host vehicle to make a lane change to the adjacent lane, and perform control for moving the host vehicle away from the adjacent lane before the entry operation is completed.

In the vehicle control device according to the first aspect of the present disclosure, the region that is not the host vehicle lane may be a merging path to be merged with the adjacent lane.

With the vehicle control device according to the first aspect of the present disclosure, it is possible to detect the entry operation of the mobile body on the merging path to be merged with the adjacent lane for the host vehicle to enter the adjacent lane, and perform control for moving the host vehicle away from the adjacent lane before the entry operation is completed.

In the vehicle control device according to the first aspect of the present disclosure, the region that is not the host vehicle lane may be an entry and exit path for a facility that faces the adjacent lane.

With the vehicle control device according to the first aspect of the present disclosure, it is possible to detect the entry operation of the mobile body on the entry and exit path for a facility that faces the adjacent lane for the host vehicle to enter the adjacent lane, and perform control for moving the host vehicle away from the adjacent lane before the entry operation is completed.

In the vehicle control device according to the first aspect of the present disclosure, the steering control may include correcting a target travel trajectory for the host vehicle in a direction away from the adjacent lane, and moving the host vehicle onto the corrected target travel trajectory.

With the vehicle control device according to the first aspect of the present disclosure, the steering control includes correcting the target travel trajectory for the host vehicle and moving the host vehicle onto the corrected travel trajectory, and therefore the travel position of the host vehicle is rendered clear compared to the case where other steering control is performed.

In the vehicle control device according to the first aspect of the present disclosure, the processor may be configured to render an amount of movement of the host vehicle in a direction away from the adjacent lane in the steering control larger as a lateral speed of the mobile body in the entry operation is higher.

With the vehicle control device according to the first aspect of the present disclosure, the amount of movement of the host vehicle is rendered larger as the lateral speed of the mobile body in the entry operation is higher. This makes it possible to suppress the sense of insecurity to be had by the occupants of the host vehicle since the lateral speed of the mobile body is high.

In the vehicle control device according to the first aspect of the present disclosure, the processor may be configured to predict an initial predicted position at a time before start of the steering control, the initial predicted position being a predicted position of the mobile body at a time when the entry operation is completed, and determine whether the initial predicted position is included in a control execution area determined in advance with reference to a host vehicle position. The processor may be configured to perform the steering control when the processor has determined that the initial predicted position is included in the control execution area. The processor may be configured not to perform the steering control when the processor has determined that the initial predicted position is not included in the control execution area.

With the vehicle control device according to the first aspect of the present disclosure, the steering control is not performed when the initial predicted position of the mobile body at the time when the entry operation is completed is not included in a region determined in advance with reference to the host vehicle position. This makes it possible to prevent the steering control from being unnecessarily performed.

In the vehicle control device according to the first aspect of the present disclosure, the processor may be configured to: set a predicted travel trajectory that is a predicted trajectory for travel of the mobile body; and predict the initial predicted position based on the predicted travel trajectory and a target travel trajectory for the host vehicle.

With the vehicle control device according to the first aspect of the present disclosure, an initial predicted position is predicted based on the predicted travel trajectory of the mobile body and the target travel trajectory for the host vehicle. This makes it possible to predict an initial predicted position with high accuracy.

In the vehicle control device according to the first aspect of the present disclosure, the processor may be configured to: acquire a size of the mobile body in a lateral direction; and determine whether the size in the lateral direction is more than a predetermined threshold. The processor may be configured to perform the steering control when the processor has determined that the size in the lateral direction is more than the predetermined threshold. The processor may be configured not to perform the steering control when the processor has determined that the size in the lateral direction is not more than the predetermined threshold.

With the vehicle control device according to the first aspect of the present disclosure, the steering control is not performed when the size of the mobile body in the lateral direction is not more than the predetermined threshold. This makes it possible to prevent the steering control from being unnecessarily performed even though the sense of insecurity of the occupants is slight.

In the vehicle control device according to the first aspect of the present disclosure, the predetermined threshold may be smaller as a lane width of the host vehicle lane is smaller.

With the vehicle control device according to the first aspect of the present disclosure, it is possible to determine whether the steering control is required in consideration of the fact that the host vehicle lane and the adjacent lane tend to be close in the lateral position to each other and the occupants tend to have a sense of insecurity when the lane width of the host vehicle lane is small.

In the vehicle control device according to the first aspect of the present disclosure, the predetermined threshold may be smaller as a lane width of the adjacent lane is smaller.

With the vehicle control device according to the first aspect of the present disclosure, it is possible to determine whether the steering control is required in consideration of the fact that the host vehicle lane and the adjacent lane tend to be close in the lateral position to each other and the occupants tend to have a sense of insecurity when the lane width of the adjacent lane is small.

In the vehicle control device according to the first aspect of the present disclosure, the processor may be configured to perform cancellation steering control when the entry operation is canceled at a time during execution of the steering control or after completion of the steering control. The cancellation steering control may be performed to control steering of the host vehicle such that the travel position of the host vehicle in the width direction of the host vehicle lane is returned to a position before start of the steering control.

With the vehicle control device according to the first aspect of the present disclosure, it is possible to avoid the occupants having a sense of insecurity as the host vehicle continues traveling off the original position even though the entry operation of the mobile body has been canceled.

In the vehicle control device according to the first aspect of the present disclosure, the processor may be configured to: predict a during-execution predicted position at a time during execution of the steering control or after completion of the steering control, the during-execution predicted position being a predicted position of the mobile body at a time of completion of the entry operation; and determine whether the during-execution predicted position is included in a control continuation area determined in advance with reference to a host vehicle position. The processor may be configured to perform cancellation steering control when the processor has determined that the during-execution predicted position is not included in the control continuation area. The cancellation steering control may be performed to control steering of the host vehicle such that the travel position of the host vehicle in the width direction of the host vehicle lane is returned to a position before start of the steering control.

With the vehicle control device according to the first aspect of the present disclosure, it is possible to avoid the occupants having a sense of insecurity as the host vehicle continues traveling off the original position even though it is no longer expected that the host vehicle and the mobile body approach each other.

A second aspect of the present disclosure provides a vehicle control method executed by a computer, the vehicle control method including: detecting a mobile body located in a region that is not a host vehicle lane in which a host vehicle is traveling, out of regions that are adjacent to an adjacent lane that is adjacent to the host vehicle lane; detecting entry operation of the mobile body to enter the adjacent lane; and when the entry operation is detected, performing steering control for the host vehicle such that a travel position of the host vehicle within the host vehicle lane in a width direction of the host vehicle lane is moved in a direction away from the adjacent lane before the entry operation is completed.

A third aspect of the present disclosure provides a non-transitory storage medium storing instructions that are executable by one or more processors and that cause the one or more processors to perform functions. The functions include: detecting a mobile body located in a region that is not a host vehicle lane in which a host vehicle is traveling, out of regions that are adjacent to an adjacent lane that is adjacent to the host vehicle lane; detecting entry operation of the mobile body to enter the adjacent lane; and when the entry operation is detected, performing steering control for the host vehicle such that a travel position of the host vehicle within the host vehicle lane in a width direction of the host vehicle lane is moved in a direction away from the adjacent lane before the entry operation is completed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 16 is a flowchart illustrating processes of the cancellation steering control performed by an ECU 100 according to the fourth embodiment of the present disclosure.

DETAILED DESCRIPTION OF EMBODIMENTS

Embodiments of the present disclosure will be described below with reference to the drawings. In the following description, similar or equivalent elements are denoted by like signs to omit redundant description.

First Embodiment

Figure 1:
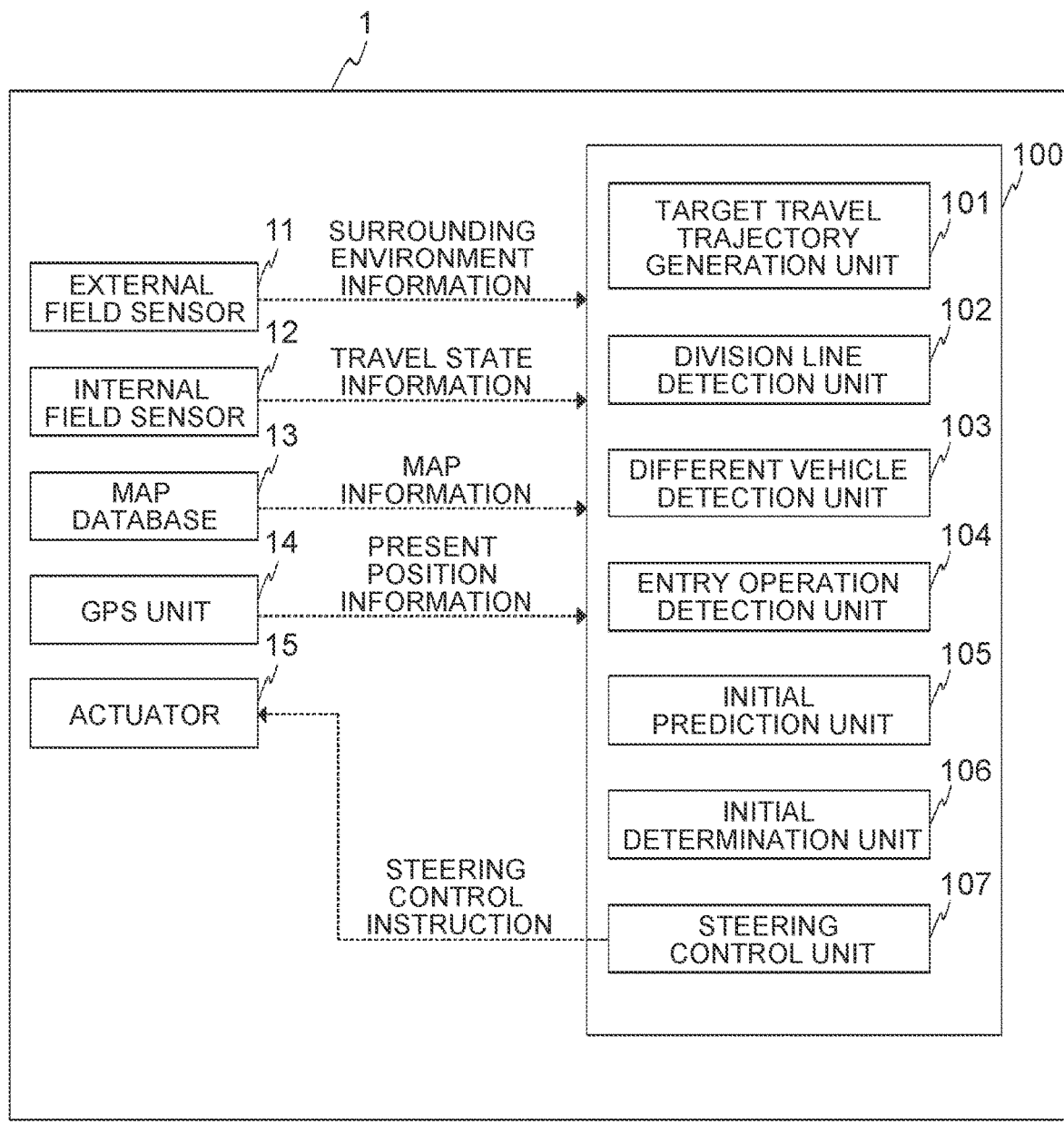
FIG. 1 is a block diagram illustrating the configuration of a host vehicle 1 according to a first embodiment of the present disclosure.

FIG. 1 is a block diagram illustrating the configuration of a host vehicle 1 according to a first embodiment of the present disclosure. The host vehicle 1 includes an external field sensor 11, an internal field sensor 12, a map database 13, a global positioning system (GPS) unit 14, an actuator 15, and an electronic control unit (ECU) 100. The ECU 100 is an example of the "vehicle control device" according to the present disclosure and includes, as its functional components, a target travel trajectory generation unit 101, a division line detection unit 102, a different vehicle detection unit 103, an entry operation detection unit 104, an initial prediction unit 105, an initial determination unit 106, and a steering control unit 107. The ECU 100 may be constituted from a processor.

The host vehicle 1 is configured to be able to implement a drive assist function to assist at least steering, among drive, steering, and braking, using constituent elements including the ECU 100. The host vehicle 1 is an autonomous driving vehicle classified into level 2 or higher in the autonomous driving levels defined by the Society of Automotive Engineers (SAE), for example.

The external field sensor 11 is a sensor for detecting the surrounding environment of the host vehicle 1. The surrounding environment includes information on the position, shape, speed, etc. of road structures such as road white lines, road signs, guardrails, and poles around the host vehicle 1 and the different vehicle 2, dynamic targets such as surrounding vehicles and pedestrians, static targets such as buildings and signboards, etc. Examples of the external field sensor 11 include a camera, a millimeter-wave radar, and a laser imaging detection and ranging (LIDAR). The external field sensor 11 transmits detected information to the ECU 100. The external field sensor 11 may be various sensors mounted on the host vehicle 1, or may be various sensors mounted on the different vehicle 2 or a road facility if such sensors are communicably connected to the ECU 100. The sensor 11 is communicably connected to the ECU 100 using vehicle-to-vehicle (V2V) communication when a sensor mounted on the different vehicle 2 is used as the sensor not mounted on the host vehicle 1, and using vehicle-to-everything (V2X) communication when a sensor on a road facility is used. The external field sensor 11 may be a sensor unit constituted from a combination of a plurality of sensors.

The internal field sensor 12 is mounted on the host vehicle 1, and acquires information on the present travel state of the host vehicle 1. Examples of the internal field sensor 12 include a wheel speed sensor, an acceleration sensor, a yaw rate sensor, and a compass. The internal field sensor 12 may be a sensor unit constituted from a combination of a plurality of sensors.

The map database 13 is a database that stores map information including road network information, road geometry information, lane information, static obstacle information, etc., and is stored in a storage medium that is accessible from the ECU 100 such as a hard disk drive (HDD) and a solid state drive (SSD). The storage location of the map database 13 is not specifically limited as long as the map database 13 is accessible from the ECU 100, and the map database 13 may be mounted on the host vehicle 1 or stored in an external server not mounted on the host vehicle 1. When an external server is used, the external server is accessed from the ECU 100 using vehicle-to-everything communication or a mobile terminal communication network such as long term evolution (LTE).

The GPS unit 14 acquires present position information on the host vehicle 1 based on radio waves received from global positioning system (GPS) satellites. The acquired present position information is transmitted to the ECU 100.

The actuator 15 is mounted on the host vehicle 1. The actuator 15 is a travel device for varying the state of drive, steering, and braking of the host vehicle 1. Various drive assist functions or autonomous driving functions for the host vehicle 1 are implemented by the actuator 15 implementing control related to travel of the host vehicle 1 as instructed by the ECU 100.

The ECU 100 is constituted from one or more computers. The computers include a central processing unit (CPU), a read only memory (ROM), a random access memory (RAM), an input port, an output port, etc. A variety of functions are implemented by installing a variety of programs in the computers. The ECU 100 transmits and receives data to and from various units of the host vehicle 1 by communicating with the various units through the input port and the output port. In particular, the ECU 100 receives surrounding environment information from the external field sensor 11, receives travel state information on the host vehicle 1 from the internal field sensor 12, receives the map information from the map database 13, and receives host vehicle position information from the GPS unit 14. The ECU 100 transmits a control instruction related to travel of the host vehicle 1 to the actuator 15.

Next, the functional configuration of the ECU 100 will be described.

The target travel trajectory generation unit 101 generates a target travel trajectory T1 for the host vehicle 1 based on the surrounding environment information acquired by the external field sensor 11, the travel state information acquired by the internal field sensor 12, the map information acquired by the map database 13, and the present position information acquired by the GPS unit 14. The target travel trajectory T1 is a target trajectory that indicates what positions the host vehicle 1 will travel through in the future. The target travel trajectory T1 may be a trajectory that extends along the lane center of a host vehicle lane L1, for example. The target travel trajectory T1 is generated based on the trajectory that extends along the lane center of the host vehicle lane L1 by making appropriate corrections from the lane center of the host vehicle lane L1. The correction is based on the surrounding environment such as surrounding targets and road structures and the travel state of the host vehicle 1 such as vehicle speed, acceleration, and steering angle. The target travel trajectory T1 is also corrected by the steering control unit 107 to be discussed later.

The division line detection unit 102 recognizes division lines of lanes in which the host vehicle 1 and the different vehicle 2 travel and surrounding lanes based on a signal received from the external field sensor 11. The "division lines" include white lines and yellow lines that indicate the boundary of roads and lanes, and road boundary lines formed from road markers, curbs, etc.

The different vehicle detection unit 103 detects a different vehicle 2 that is present around the host vehicle 1 based on a signal received from the external field sensor 11. The different vehicle detection unit 103 acquires information on the different vehicle 2 such as position, shape, size, speed, and travel direction.

In the present embodiment, in particular, the different vehicle detection unit 103 detects a different vehicle 2 located in a region that is not the host vehicle lane L1, of (among) regions that are adjacent to an adjacent lane L2 that is adjacent to the host vehicle lane L1 in which the host vehicle 1 is traveling. Examples of such a position include a position (FIG. 2 or 5) on a second adjacent lane L3 for the host vehicle lane L1, a position (FIG. 3) on a merging path L4 to be merged with the adjacent lane L2 for the host vehicle lane L1, and a position (FIG. 4) on an entry and exit path L5 for a facility 3 that faces the adjacent lane L2 for the host vehicle lane L1. The "adjacent lane" and the "second adjacent lane" in the present embodiment are not limited to lanes with the same travel direction as the host vehicle lane L1, and may also include lanes (so-called "oncoming lanes") with a different travel direction from the host vehicle lane L1. For example, the lane L2 illustrated in FIG. 5 is included in the "adjacent lane", and the lane L3 illustrated in FIG. 5 is included in the "second adjacent lane".

The "position" of the host vehicle 1 and the different vehicle 2 is the center position of the host vehicle 1 and the different vehicle 2. Alternatively, the "position" of the host vehicle 1 and the different vehicle 2 may be the center position of the front end of the host vehicle 1 and the different vehicle 2.

The entry operation detection unit 104 detects entry operation of the different vehicle 2 located in a region that is not the host vehicle lane L1, of regions that are adjacent to the adjacent lane L2 for the host vehicle lane L1, to enter the adjacent lane L2 for the host vehicle lane L1 based on a signal received from the external field sensor 11. For example, the entry operation detection unit 104 detects entry operation (FIG. 2 or 5) of the different vehicle 2 traveling in the second adjacent lane L3 for the host vehicle lane L1 to make a lane change to the adjacent lane L2, detects entry operation (FIG. 3) of the different vehicle 2 traveling in the merging path L4 that is merged with the adjacent lane L2 for the host vehicle lane L1 to enter the adjacent lane L2, and detects entry operation (FIG. 4) of the different vehicle 2 located in the entry and exit path L5 for a facility 3 that faces the adjacent lane L2 for the host vehicle lane L1 to enter the adjacent lane L2. The entry operation is detected based on the vehicle speed of the different vehicle 2, acceleration, tilt with respect to the lanes etc., state of lighting of turn signals, etc. The entry operation is considered as being started at the time when a component of the speed of the different vehicle 2 in the direction of the adjacent lane becomes a predetermined threshold speed or more, for example.

The initial prediction unit 105 predicts an initial predicted position at the time before the start of steering control by the steering control unit 107, the initial predicted position being a predicted position of the different vehicle 2 at the time when entry operation is completed. The initial predicted position is the position of the different vehicle 2 relative to the host vehicle 1. In the present embodiment, the initial prediction unit 105 predicts a longitudinal position and a lateral position of the different vehicle 2 relative to the host vehicle 1 as an example of the initial predicted position. The initial prediction unit 105 makes a prediction through the procedure described below.

First, the initial prediction unit 105 sets a predicted travel trajectory T2 of the different vehicle 2. The predicted travel trajectory T2 is a predicted trajectory that indicates what positions the different vehicle 2 will travel through in the future. When entry operation of the different vehicle 2 to enter the adjacent lane L2 is detected, the initial prediction unit 105 first generates a trajectory from the present position of the different vehicle 2 toward the adjacent lane L2 along the present travel direction of the different vehicle 2 (direction tilted with respect to the lanes). The trajectory is bent into a direction that is parallel to the adjacent lane L2 at the point at which the trajectory reaches the center of the adjacent lane L2. After that, the trajectory extends in a direction that is parallel to the adjacent lane L2 through the center of the adjacent lane L2. The initial prediction unit 105 sets a predicted travel trajectory T2 of the different vehicle 2 in the manner described above. For example, the trajectories T2 illustrated in FIGS. 2 to 5 are examples of the predicted travel trajectory T2 set by the initial prediction unit 105.

The method of setting the predicted travel trajectory T2 is not limited to the method described above, and may be other methods. For example, the predicted travel trajectory T2 may be set based on the predicted travel trajectory T2 described above by making appropriate corrections based on the surrounding environment such as surrounding targets and road structures and the travel state of the different vehicle 2 such as vehicle speed, acceleration, and steering angle. For example, a target travel trajectory for the different vehicle 2 may be received through communication between the different vehicle 2 and the host vehicle 1, and the received target travel trajectory may be set as the predicted travel trajectory T2.

Next, the initial prediction unit 105 predicts a longitudinal position and a lateral position of the different vehicle 2 in the future with respect to the host vehicle 1. The longitudinal direction is a direction that is parallel to the travel direction of the host vehicle 1. The lateral direction is a direction that is perpendicular to the longitudinal direction. The longitudinal direction may be a direction that is parallel to the host vehicle lane L1. When the host vehicle lane L1 is curved, the longitudinal direction may be the direction of a tangent to the host vehicle lane L1 at the present position of the host vehicle 1.

The initial prediction unit 105 predicts a longitudinal position and a lateral position based on the target travel trajectory T1 for the host vehicle 1 and the predicted travel trajectory T2 of the different vehicle 2. Specifically, the initial prediction unit 105 calculates what point on the target travel trajectory T1 the host vehicle 1 will be positioned at and what point on the predicted travel trajectory T2 the different vehicle 2 will be positioned at, at the time of completion of the entry operation of the different vehicle 2 into the adjacent lane L2. This calculation may be made on the assumption that the host vehicle 1 and the different vehicle 2 will maintain the present vehicle speed. Alternatively, vehicle speed plan information may be used when the vehicle speed plan information has been obtained, the vehicle speed plan information indicating a vehicle speed plan that is used for the host vehicle 1 and the different vehicle 2 to travel on the target travel trajectory T1 and the predicted travel trajectory T2, respectively. The initial prediction unit 105 predicts a longitudinal position and a lateral position based on the calculated positions of the host vehicle 1 and the different vehicle 2.

The "time of completion" of the entry operation is the time when the travel direction of the different vehicle 2 has become parallel to the adjacent lane L2 after the different vehicle 2 reaches the center of the adjacent lane L2. The time of completion of the entry operation may be estimated by the ECU 100, e.g. by the initial prediction unit 105.

The initial determination unit 106 determines whether the initial predicted position of the different vehicle 2 is included in a control execution area. The control execution area is a region determined in advance with reference to the position of the host vehicle 1. When the initial predicted position of the different vehicle 2 is included in the control execution area, control for correcting the target travel trajectory T1 such that the host vehicle 1 is moved in a direction away from the adjacent lane is necessary. Conversely, such control is not necessary when the initial predicted position of the different vehicle 2 is not included in the control execution area.

Figure 6:
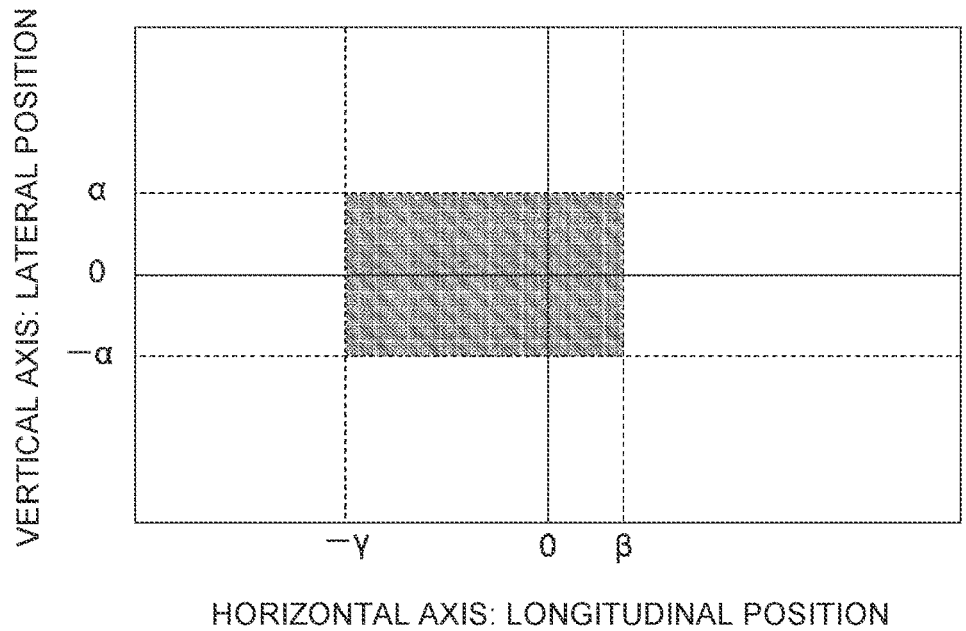
FIG. 6 illustrates an example of a control execution area for the longitudinal position and the lateral position of a different vehicle 2.

FIG. 6 illustrates an example of the control execution area. In the present example, the control execution area is defined as an area with the lateral position ranging from $-\alpha$ to $\alpha$ and with the longitudinal position ranging from $-\gamma$ to $\beta$. The longitudinal position is positive when the host vehicle 1 is located ahead of the different vehicle 2, and is negative when the host vehicle 1 is located behind the different vehicle 2. The lateral position is positive when the host vehicle 1 is located on the right side of the different vehicle 2, and is negative when the host vehicle 1 is located on the left side of the different vehicle 2. In the present example, the control execution area is larger on the negative side in the longitudinal direction than on the positive side (i.e. the absolute value of $\gamma$ is larger than the absolute value of $\beta$). This is because the occupants of the host vehicle 1 have a relatively great sense of insecurity when the host vehicle 1 is located behind the different vehicle 2 compared to the case where the host vehicle 1 is located ahead of the different vehicle 2, in which case the occupants of the host vehicle 1 have a relatively slight sense of insecurity. The control execution area is not limited to the example in FIG. 6. For example, the range of the control execution area in the longitudinal direction may be the same on the positive side and the negative side (i.e. $\beta=\gamma$). Alternatively, other control execution areas may be used.

When the combination of the longitudinal position and the lateral position predicted is included in the control execution area, the steering control unit 107 instructs the actuator 15 to perform steering control for the host vehicle 1. The steering control unit 107 performs steering control such that the travel position of the host vehicle 1 within the host vehicle lane L1 in the width direction of the host vehicle lane L1 is moved in a direction away from the adjacent lane L2.

In order to perform the steering control, the steering control unit 107 corrects the target travel trajectory T1 into a direction of moving the host vehicle 1 away from the adjacent lane. The amount of correction may be set to a constant value (e.g. 50 cm) determined in advance, or may be a distance obtained by multiplying the distance from the center to an end of the host vehicle lane L1 by a constant proportion (e.g. 50%). After the target travel trajectory T1 is corrected, the host vehicle 1 is steered so as to move the host vehicle 1 onto a corrected target travel trajectory T' 1. The host vehicle 1 is moved away from the adjacent lane L2 through the steering control. The target travel trajectory T1 may be corrected, as appropriate, so as not to interfere with the positions of other targets, obstacles, road division lines, etc. based on the information obtained from the external field sensor 11, the map database 13, and the GPS unit 14.

The amount of correction for the target travel trajectory T1 may be determined in accordance with the lateral speed of the different vehicle 2. During the entry operation of the different vehicle 2, the occupants of the host vehicle 1 have a greater sense of insecurity as the different vehicle 2 approach the host vehicle 1 at a higher speed. In order to suppress their sense of insecurity, the amount of correction for the target travel trajectory T1 may be rendered larger as the lateral speed (i.e. the speed at which the different vehicle 2 approaches the host vehicle 1) during the entry operation of the different vehicle 2 is higher. This makes it possible for the host vehicle 1 to travel farther away from the adjacent lane L2 as the lateral speed of the different vehicle 2 is higher, which makes it possible to effectively suppress the sense of insecurity to be had by the occupants of the host vehicle 1.

Next, scenes to which the first embodiment of the present disclosure is applied will be described with reference to FIGS. 2 to 5. FIGS. 2 to 5 merely illustrate specific scenes, and the scenes to which the present disclosure is applicable are not limited to the scenes in FIGS. 2 to 5.

Figure 2:
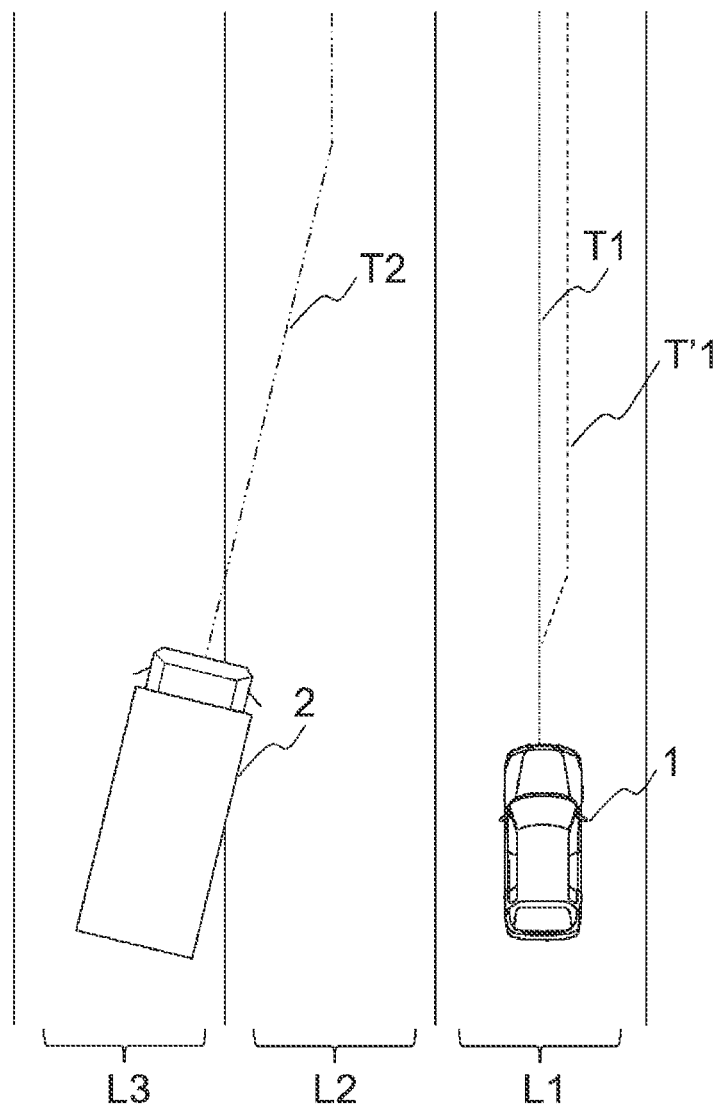
FIG. 2 illustrates a scene in which a different vehicle 2 that is present within a second adjacent lane L3 makes a lane change to an adjacent lane L2.

FIG. 2 illustrates a scene in which a different vehicle 2 that is present within a second adjacent lane L3 for the host vehicle lane L1 makes a lane change to an adjacent lane L2. The host vehicle 1 is traveling along the target travel trajectory T1 within the host vehicle lane L1. The different vehicle 2 in the second adjacent lane L3 tilts its vehicle body in the direction of the adjacent lane L2. At this time, the initial prediction unit 105 generates a predicted travel trajectory T2 of the different vehicle 2. The predicted travel trajectory T2 is a trajectory that allows the different vehicle 2 to travel straight to the center of the adjacent lane L2 along the present travel direction of the different vehicle 2 (direction tilted with respect to the lanes), thereafter be curved into a direction that is parallel to the adjacent lane L2, and thereafter travel in a direction that is parallel to the adjacent lane L2 through the center of the adjacent lane L2. The initial prediction unit 105 predicts a longitudinal position and a lateral position of the different vehicle 2 with respect to the host vehicle 1 based on the target travel trajectory T1 for the host vehicle 1 and the predicted travel trajectory T2 of the different vehicle 2. The steering control unit 107 corrects the target travel trajectory T1 for the host vehicle 1 into a target travel trajectory T' 1 based on the fact that the combination of the longitudinal position and the lateral position is included in the control execution area. That is, the steering control unit 107 performs steering control for the host vehicle 1 into a direction away from the adjacent lane L2. Thus, steering control is performed to move the host vehicle 1 away from the adjacent lane L2 since before the different vehicle 2 completes a lane change to the adjacent lane L2 (in particular without waiting for the lane change to be completed), which makes it possible to suppress the sense of insecurity of the occupants of the host vehicle 1.

Figure 3:
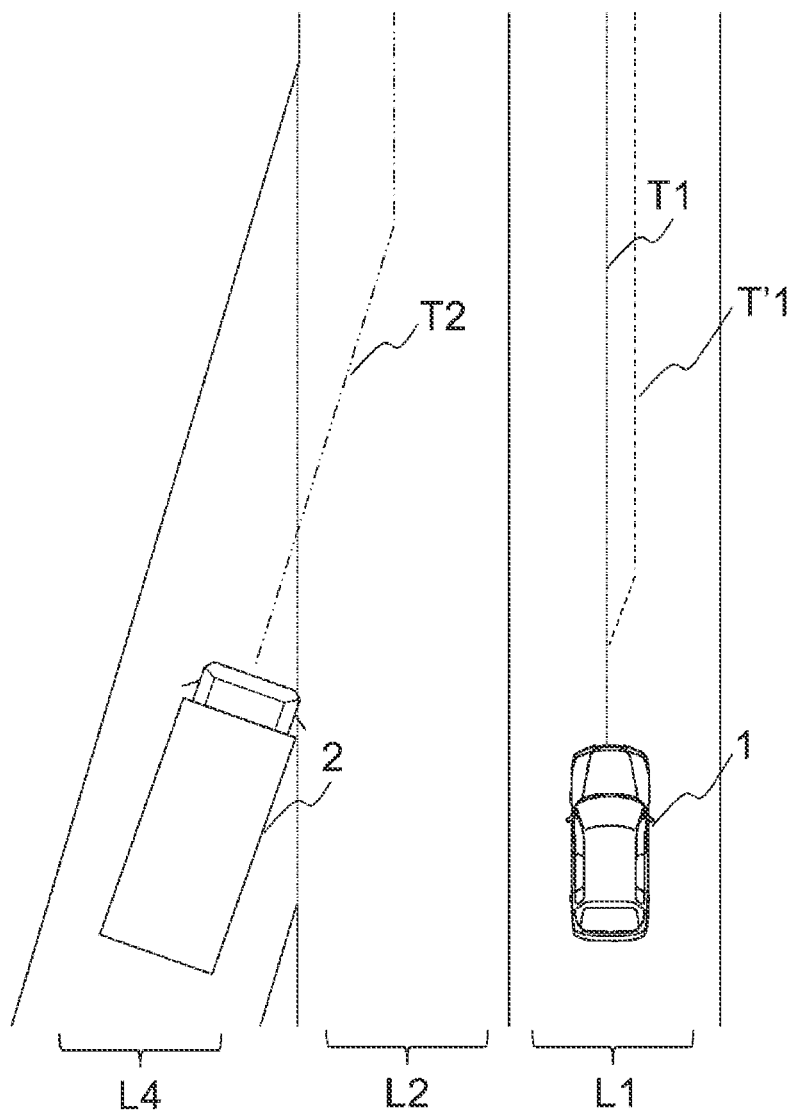
FIG. 3 illustrates a scene in which a different vehicle 2 that is present within a merging path L4 enters an adjacent lane L2.

FIG. 3 illustrates a scene in which the different vehicle 2 that is present in the merging path L4 to be merged with the adjacent lane L2 for the host vehicle lane L1 enters the adjacent lane L2. The host vehicle 1 is traveling along the target travel trajectory T1 within the host vehicle lane L1. The different vehicle 2 in the merging path L4 is detected, and entry operation of the different vehicle 2 to travel obliquely in the direction of the adjacent lane L2 is detected. At this time, as in the case in FIG. 2, a predicted travel trajectory T2 of the different vehicle 2 is generated, and a longitudinal position and a lateral position of the different vehicle 2 in the future are predicted. The steering control unit 107 corrects the target travel trajectory T1 for the host vehicle 1 into a target travel trajectory T' 1, and performs steering control for the host vehicle 1 into a direction away from the adjacent lane L2, based on the fact that the combination of the longitudinal position and the lateral position in the future is included in the control execution area. Thus, steering control is performed to move the host vehicle 1 away from the adjacent lane L2 since before the different vehicle 2 finishes entering the adjacent lane L2 (in particular without waiting for the lane change to be completed), which makes it possible to suppress the sense of insecurity of the occupants of the host vehicle 1.

Figure 4:
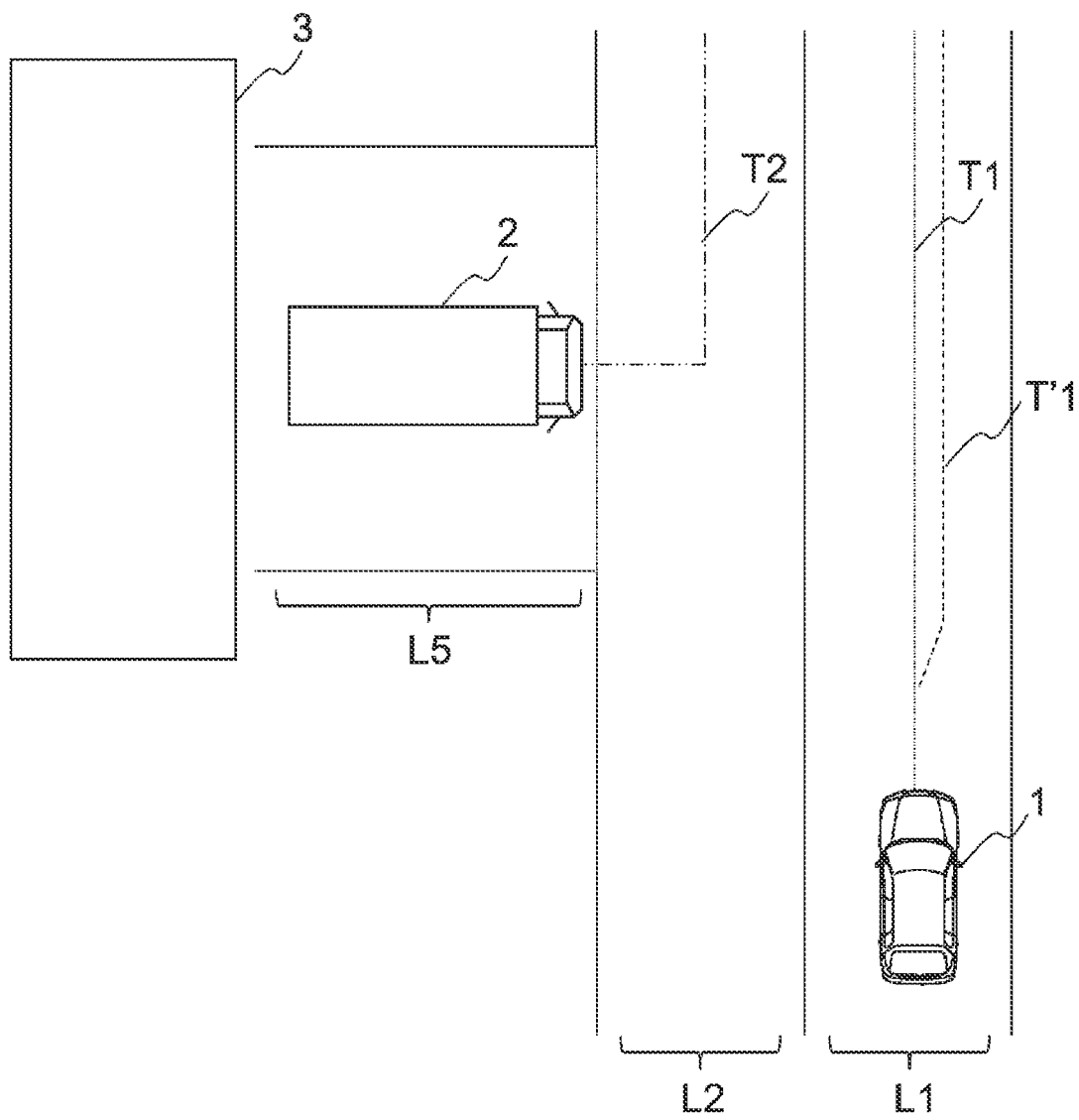
FIG. 4 illustrates a scene in which a different vehicle 2 that is present within an entry and exit path L5 for a facility 3 enters an adjacent lane L2.
Figure 5:
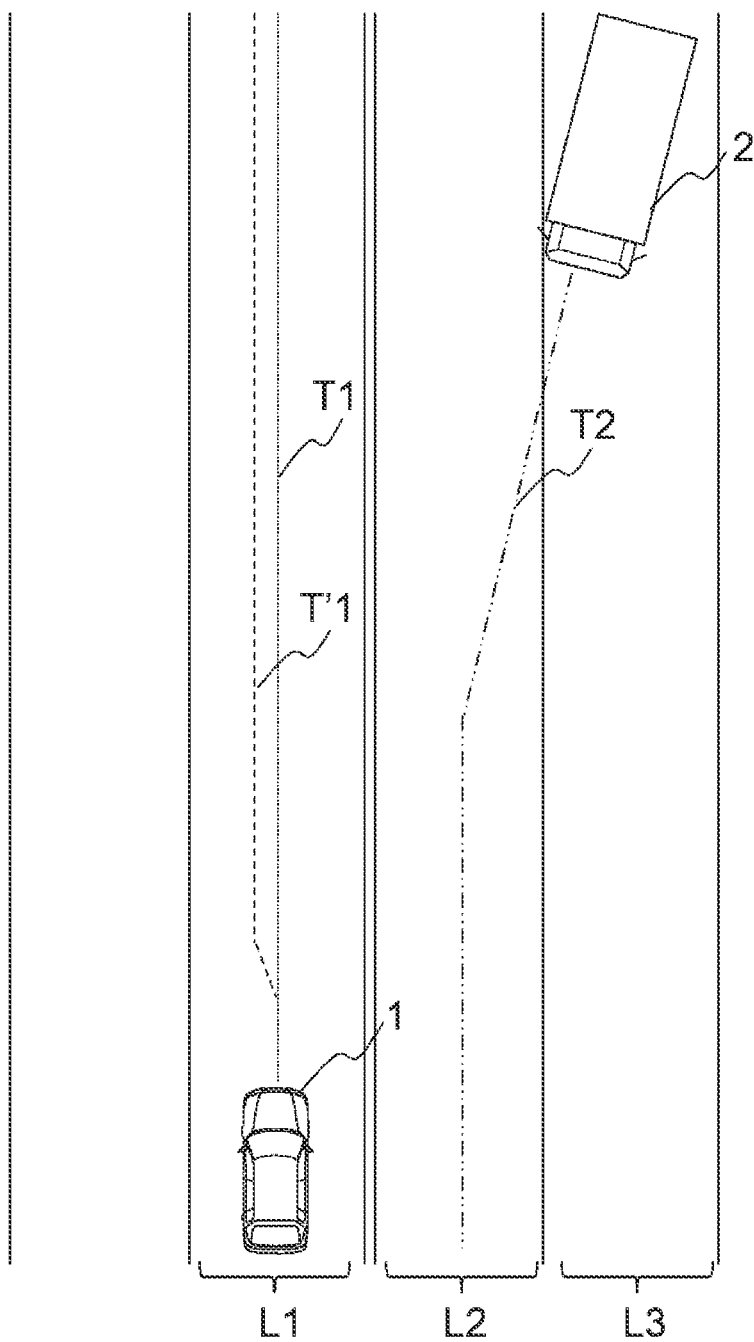
FIG. 5 illustrates a scene in which a different vehicle 2 that is present within a second adjacent lane L3 as an oncoming lane makes a lane change to an adjacent lane L2 as an oncoming lane.

FIG. 4 illustrates a scene in which a different vehicle 2 that is present within an entry and exit path L5 for a facility 3 that faces an adjacent lane L2 enters the adjacent lane L2. The host vehicle 1 is traveling along the target travel trajectory T1 within the host vehicle lane L1. The different vehicle 2 in the entry and exit path L5 is detected, and entry operation of the different vehicle 2 to travel in the direction of the adjacent lane L2 is detected. At this time, as in the case in FIG. 2, a predicted travel trajectory T2 of the different vehicle 2 is generated, and a longitudinal position and a lateral position of the different vehicle 2 in the future are predicted. The steering control unit 107 corrects the target travel trajectory T1 for the host vehicle 1 into a target travel trajectory T'1 based on the fact that the combination of the longitudinal position and the lateral position in the future is included in the control execution area. That is, the steering control unit 107 performs steering control for the host vehicle 1 into a direction away from the adjacent lane L2. Thus, steering control is performed to move the host vehicle 1 away from the adjacent lane L2 since before the different vehicle 2 completes entry into the adjacent lane L2 (in particular without waiting for the lane change to be completed), which makes it possible to suppress the sense of insecurity of the occupants of the host vehicle 1.

FIG. 5 illustrates a scene in which a different vehicle 2 that is present within a second adjacent lane L3 as an oncoming lane makes a lane change to an adjacent lane L2 as an oncoming lane. In the present embodiment, control is performed similarly even when the travel direction of the adjacent lane L2 and the second adjacent lane L3 is different from that of the host vehicle lane L1. Thus, control that is similar to the scene in FIG. 2 is performed also in the scene in FIG. 5, which makes it possible to suppress the sense of insecurity of the occupants.

Figure 7A:
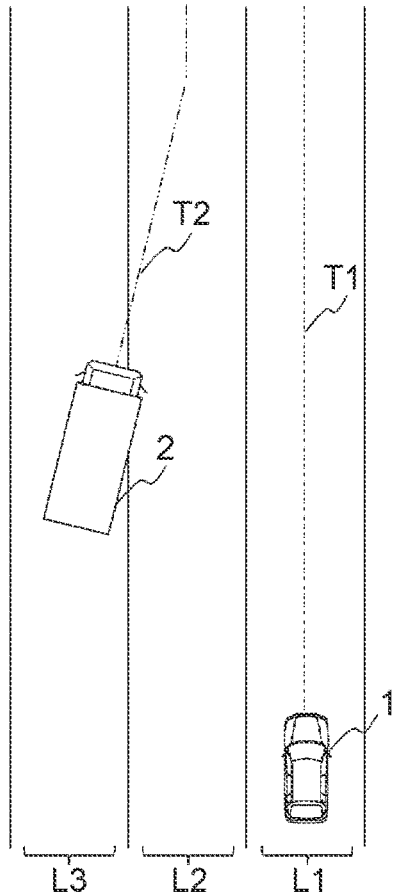
FIG. 7A illustrates a case where steering control is not performed since a combination of the longitudinal position and the lateral position is not included in the control execution area.
Figure 7B:
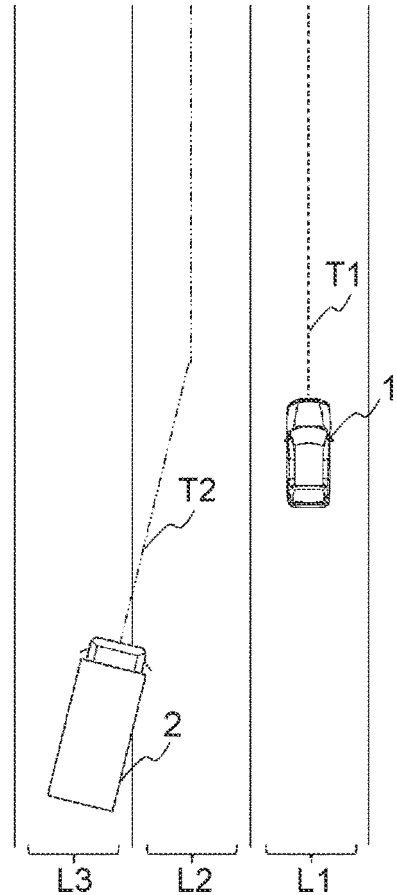
FIG. 7B illustrates a case where steering control is not performed since a combination of the longitudinal position and the lateral position is not included in the control execution area.

Next, cases where the steering control is not performed will be described with reference to FIGS. 7A and 7B. FIGS. 7A and 7B each illustrate a case where steering control is not performed since a combination of the longitudinal position and the lateral position predicted is not included in the control execution area.

In the case illustrated in FIG. 7A, the position of the different vehicle 2 is farther away from the host vehicle 1 in the longitudinal direction than in the case in FIG. 2. In this case, a sufficient longitudinal distance is kept between the different vehicle 2 and the host vehicle 1 even at the time when a lane change of the different vehicle 2 is completed. Hence, the combination of the longitudinal position and the lateral position of the different vehicle 2 predicted is not included in the control execution area. Therefore, steering control for moving the host vehicle 1 away from the adjacent lane L2 is not performed. It is conceivable that the longitudinal distance and the lateral distance are reduced with the host vehicle 1 catching up with the different vehicle 2, or with the host vehicle 1 and the different vehicle 2 moved laterally in their respective lanes, after a lane change of the different vehicle 2 to the adjacent lane L2 is completed. In such a case, steering control may be performed for the different vehicle in the adjacent lane L2.

In the case illustrated in FIG. 7B, the host vehicle 1 is located ahead of the different vehicle 2 and away from the different vehicle 2 in the longitudinal direction. Also in this case, the combination of the longitudinal position and the lateral position predicted is not included in the control execution area, and therefore correction of the target travel trajectory T1 and steering control for moving the host vehicle 1 away from the adjacent lane L2 is not performed. When the longitudinal distance and the lateral distance are reduced after lane change operation is completed, steering control may be performed for the different vehicle in the adjacent lane L2, as in the case in FIG. 7A.

Figure 8:
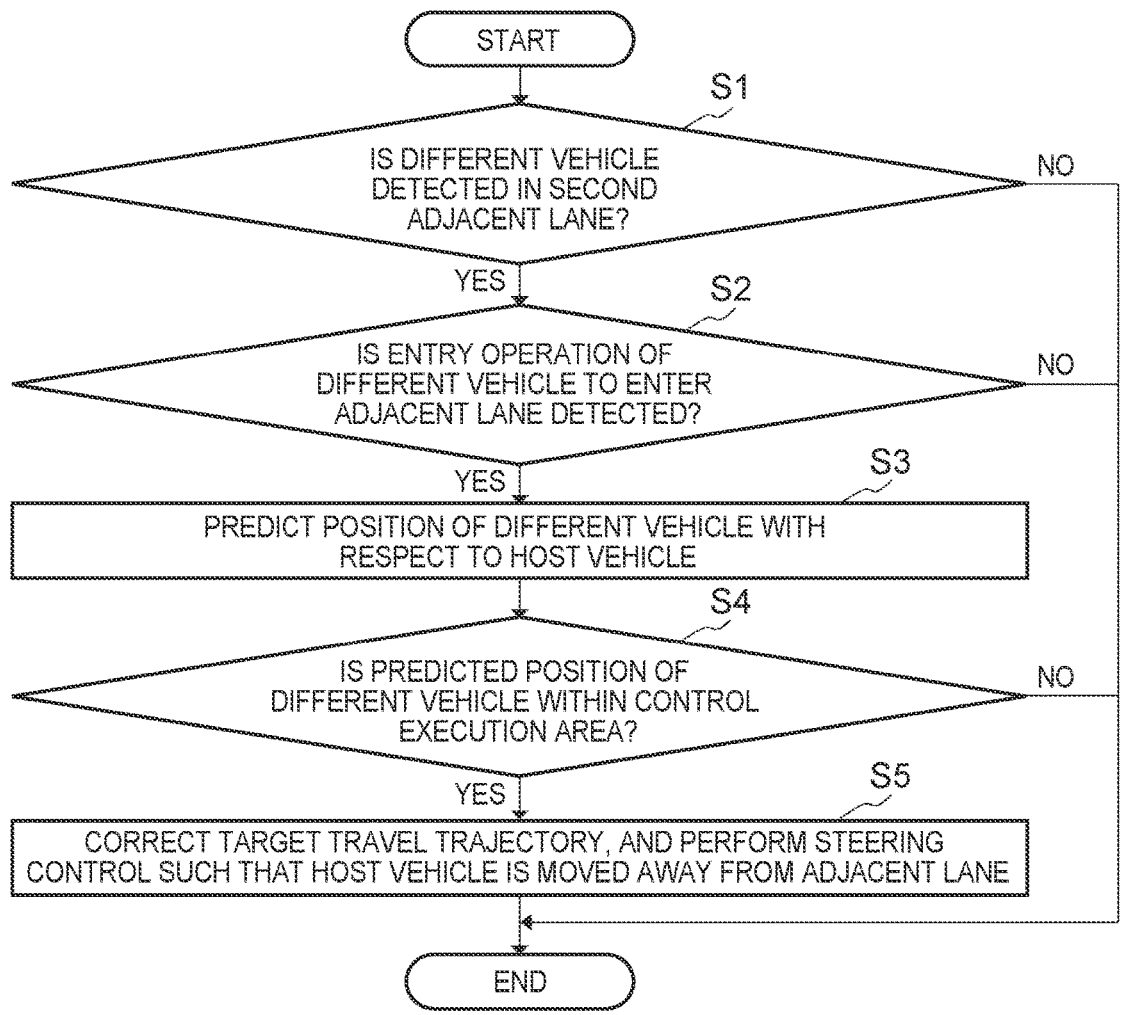
FIG. 8 is a flowchart illustrating a sequence of processes related to correction of a target travel trajectory T1 and steering control performed by an ECU 100 according to the first embodiment of the present disclosure.

The flow of processes according to the present embodiment will be described with reference to the flowchart in FIG. 8. The processes related to the present flow are repeatedly performed by the ECU 100 at predetermined intervals.

In step S1, determination is made whether a different vehicle 2 located in a region (second adjacent lane) that is not the host vehicle lane, of regions that are adjacent to the adjacent lane L2 for the host vehicle lane L1, is detected. When a different vehicle 2 is not detected (step S1: No), the process is ended. When a different vehicle 2 is detected (step S1: Yes), the process proceeds to step S2. In step S2, determination is made whether entry operation of the different vehicle 2 is detected. When entry operation is not detected (step S2: No), the process is ended. When entry operation is detected (step S2: Yes), the process proceeds to step S3.

In step S3, the initial prediction unit 105 predicts a longitudinal position and a lateral position of the different vehicle 2 with respect to the host vehicle 1 at the time when the entry operation of the different vehicle 2 is completed. In step S4, the initial determination unit 106 determines whether the combination of the longitudinal position and the lateral position predicted is included in the control execution area. When the combination of the longitudinal position and the lateral position predicted is not included in the control execution area (step S4: No), the process is ended. When the combination of the longitudinal position and the lateral position predicted is included in the control execution area (step S4: Yes), the target travel trajectory T1 is corrected and steering control is performed such that the host vehicle 1 is moved away from the adjacent lane L2 in step S5.

Figure 9:
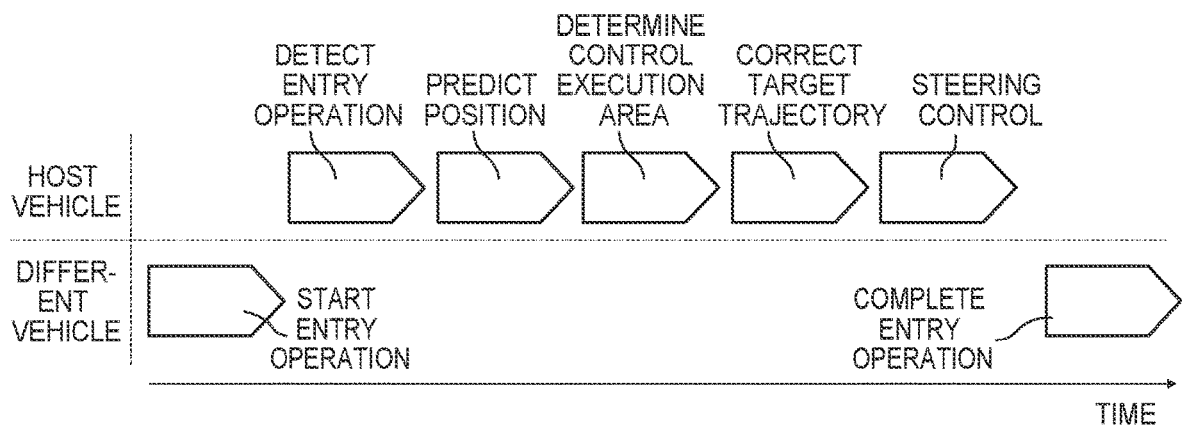
FIG. 9 illustrates the timings of the processes performed in the host vehicle 1 in the first embodiment of the present disclosure.

The timings of the processes performed in the host vehicle 1 will be described with reference to FIG. 9. When the different vehicle 2 starts entry operation, the entry operation detection unit 104 of the host vehicle 1 detects the entry operation of the different vehicle 2. Subsequently, the initial prediction unit 105 predicts positions of the host vehicle 1 and the different vehicle 2, the initial determination unit 106 determines whether the different vehicle 2 is included in the control execution area, and the steering control unit 107 corrects a target trajectory for the host vehicle 1 and performs steering control for the host vehicle 1. After that, the different vehicle 2 completes the entry operation. Thus, a sequence of processes by the host vehicle 1 is performed at the time before the different vehicle 2 completes the entry operation. At least, the sequence of process is initiated by the ECU 100 without waiting for completion of the entry operation.

In the first embodiment described above, the ECU 100 detects the different vehicle 2 located in a region that is not the host vehicle lane L1 in which the host vehicle 1 is traveling, of regions that are adjacent to the adjacent lane L2 for the host vehicle lane L1. When entry operation of the different vehicle 2 to enter the adjacent lane L2 is detected, the target travel trajectory T1 is corrected such that the host vehicle 1 is moved away from the adjacent lane and steering control is performed before the entry operation is completed. Thus, control for moving the host vehicle 1 away from the adjacent lane L2 can be performed at a timing before the different vehicle 2 completes the entry operation. Therefore, it is possible to effectively suppress the sense of insecurity of the occupants of the host vehicle 1.

Second Embodiment

A second embodiment is characterized by determining whether control is required based on the size of the different vehicle 2. Elements that are similar or equivalent to those according to the first embodiment are denoted by like signs to omit redundant description.

In the second embodiment, when a different vehicle 2 located in a region that is not the host vehicle lane L1, of regions that are adjacent to the adjacent lane L2 for the host vehicle lane L1, is detected, the different vehicle detection unit 103 acquires the size of the different vehicle 2 in the lateral direction. For example, the vehicle width of the different vehicle 2 is acquired. Then, the different vehicle detection unit 103 determines whether the acquired size in the lateral direction is more than a predetermined threshold. When the size in the lateral direction is more than the predetermined threshold, the occupants of the host vehicle 1 have a relatively great sense of insecurity when the different vehicle 2 travels in the adjacent lane L2. Therefore, the target travel trajectory T1 is corrected, and the steering control is performed. When the size in the lateral direction is not more than the predetermined threshold, on the other hand, the occupants may feel annoyed if the target travel trajectory T1 is corrected and the steering control is performed even though the occupants have a relatively slight sense of insecurity. Thus, correction of the target travel trajectory T1 and steering control are not performed when the size in the lateral direction is less than the predetermined threshold.

Figure 10:
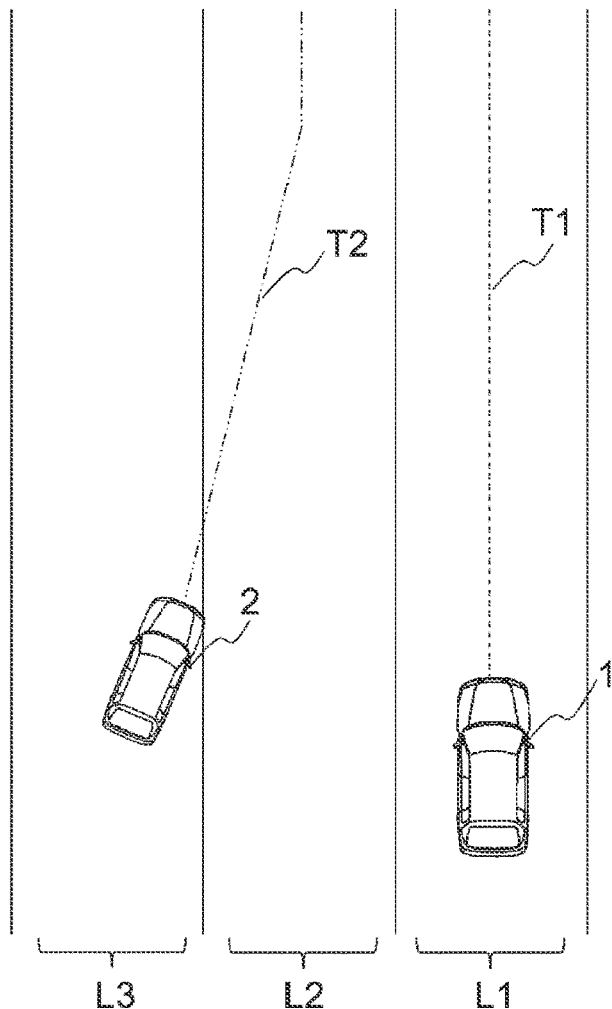
FIG. 10 illustrates a case where steering control is not performed since the vehicle width of a different vehicle 2 is less than a threshold in a second embodiment of the present disclosure.

FIG. 10 illustrates a case where steering control is not performed since the vehicle width of a different vehicle 2 is less than a threshold. The vehicle width of the different vehicle 2 illustrated in FIG. 10 is less than the vehicle width of the different vehicle 2 illustrated in FIG. 2. In this case, correction of the target travel trajectory T1 and steering control are not performed, and the host vehicle 1 continues traveling along the original target travel trajectory T1, even when the longitudinal positions and the lateral positions of the host vehicle 1 and the different vehicle 2 are included in the control execution area. Thus, it is possible to suppress unnecessary steering control and avoid the occupants feeling annoyed.

The predetermined threshold may be determined in accordance with the lane width of the host vehicle lane L1 or the adjacent lane L2. For example, the predetermined threshold may be rendered smaller as the lane width of the host vehicle lane L1 or the adjacent lane L2 is smaller. This is because the host vehicle lane L1 tends to be close in the lateral position to the adjacent lane L2 and the occupants tend to have a sense of insecurity when the lane width is small.

Figure 11:
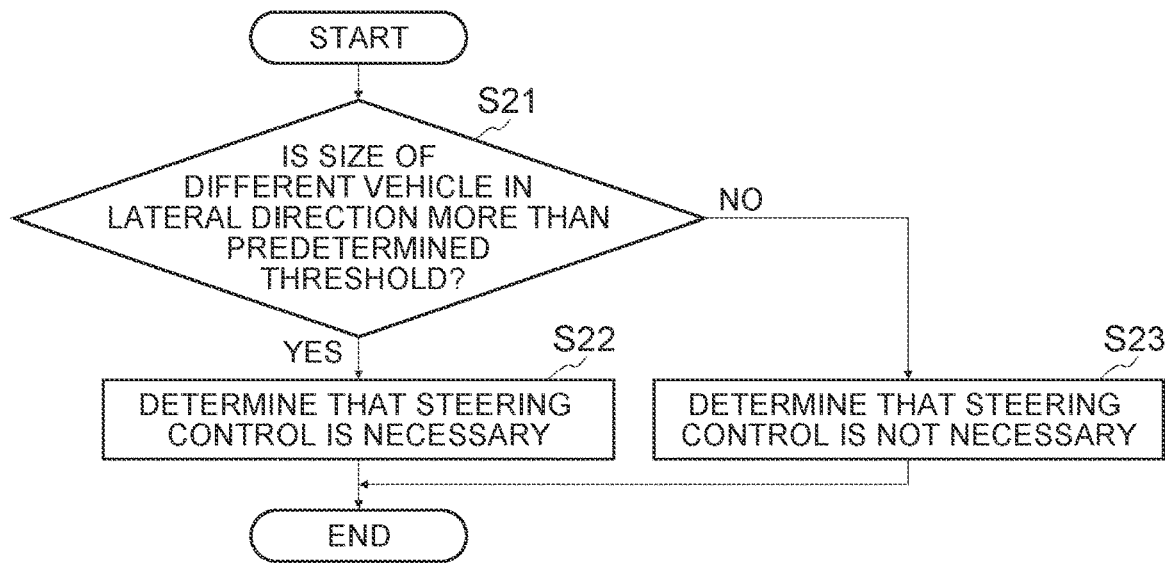
FIG. 11 is a flowchart illustrating a sequence of processes related to the determination as to whether steering control is required, made by an ECU 100 according to the second embodiment of the present disclosure.

The flow of processes for determining whether the steering control is required according to the second embodiment will be described with reference to the flowchart in FIG. 11. The processes in the flowchart in FIG. 11 are performed immediately after step S1 (immediately before step S2) in the flowchart in FIG. 8 when the determination made in step S1 is Yes. This makes it possible to omit the processes in and after step S2 when determination is made that the steering control is not required. In particular, the processes related to the prediction of a longitudinal position and a lateral position require a large amount of processing and may be a factor that increases a load on the ECU 100. Therefore, a large contribution can be made to reduce the processing load when the steering control is determined to be unnecessary and omitted. The time when the processes in the flowchart in FIG. 11 are performed is not limited to immediately after step S1 (immediately before step S2), and the processes may be performed before or after a different step. Alternatively, the processes in the flowchart in FIG. 11 may be performed separately from the processes in the flowchart in FIG. 8.

In step S21 in the flowchart in FIG. 11, determination is made whether the size of the different vehicle 2 in the lateral direction is more than a predetermined threshold. When the size of the different vehicle 2 in the lateral direction is more than the predetermined threshold (step S21: Yes), the process proceeds to step S22. In step S22, determination is made that correction of the target travel trajectory T1 and steering control are necessary. When the size of the different vehicle 2 in the lateral direction is not more than the predetermined threshold (step S21: No), on the other hand, determination is made in step S23 that correction of the target travel trajectory T1 and steering control are not necessary.

In the second embodiment described above, the ECU 100 acquires the size, in the lateral direction, of a different vehicle 2 located in a region that is not the host vehicle lane L1, of regions that are adjacent to the adjacent lane L2 for the host vehicle lane L1. When the size in the lateral direction is less than a predetermined threshold, correction of the target travel trajectory T1 and steering control are not performed. Thus, it is possible to avoid the occupants feeling annoyed as the target travel trajectory T1 is corrected and steering control is performed even though the occupants have a relatively slight sense of insecurity.

Third Embodiment

A third embodiment is characterized by performing cancellation steering control for returning the travel position of the host vehicle 1 to its position before the start of steering control when entry operation of the different vehicle 2 into the adjacent lane L2 is canceled. Elements that are similar or equivalent to those according to the first and second embodiments are denoted by like signs to omit redundant description.

In the third embodiment, the steering control unit 107 determines that entry operation of the different vehicle 2 to enter the adjacent lane L2 has been canceled based on information received from the external field sensor 11 at the time during execution of the steering control or after completion of the steering control. Cancellation of the entry operation means that the different vehicle 2 stops attempting to enter the adjacent lane L2. Cancellation of the entry operation is determined based on the different vehicle 2 being stopped, the travel direction of the different vehicle 2 being varied into a direction that is parallel to the adjacent lane L2 or a direction of moving away from the adjacent lane L2, etc. When cancellation of the entry operation is determined, the steering control unit 107 controls steering so as to return the host vehicle 1 to its position in the width direction within the host vehicle lane L1 before the steering control is performed. That is, cancellation steering control is executed.

Figure 12:
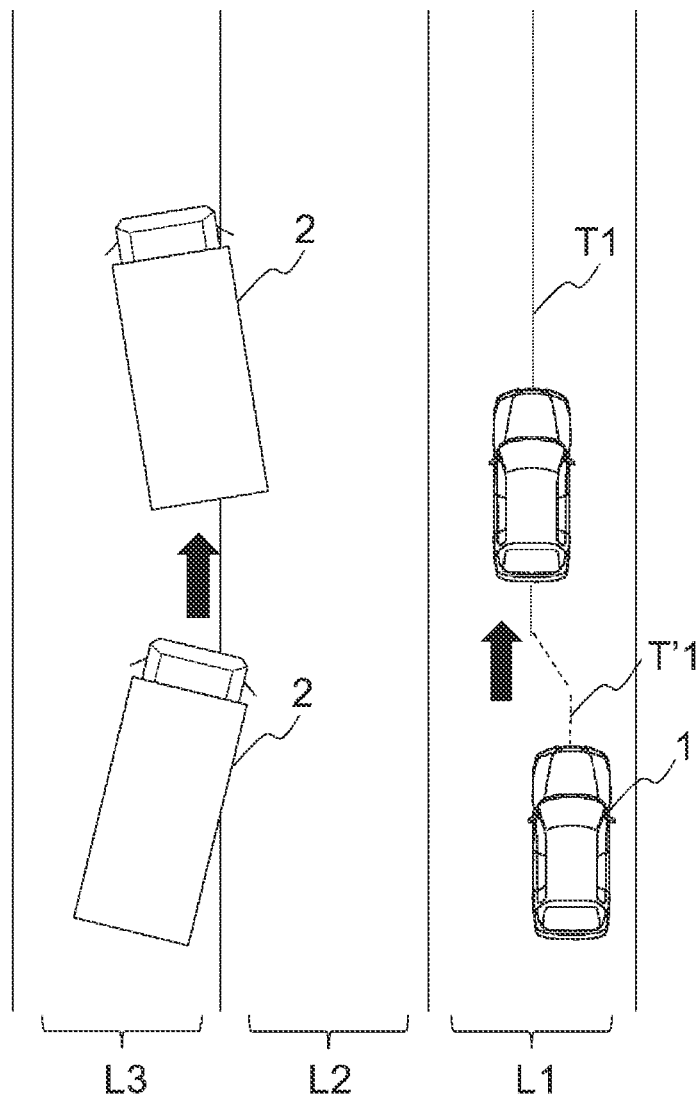
FIG. 12 illustrates a case where cancellation steering control is performed since a different vehicle 2 has canceled a lane change in a third embodiment of the present disclosure.

FIG. 12 illustrates an example of a scene according to the third embodiment. The host vehicle 1 is traveling on the corrected target travel trajectory T' 1 under the steering control by the steering control unit 107 based on detecting lane change operation of the different vehicle 2. After that, operation of the different vehicle 2 to vary its travel direction and return from the adjacent lane L2 to the second adjacent lane L3, that is, cancellation of the lane change operation, is detected. Accordingly, cancellation steering control for the host vehicle 1 is executed, and the host vehicle 1 is returned onto the original target travel trajectory T1.

Figure 13:
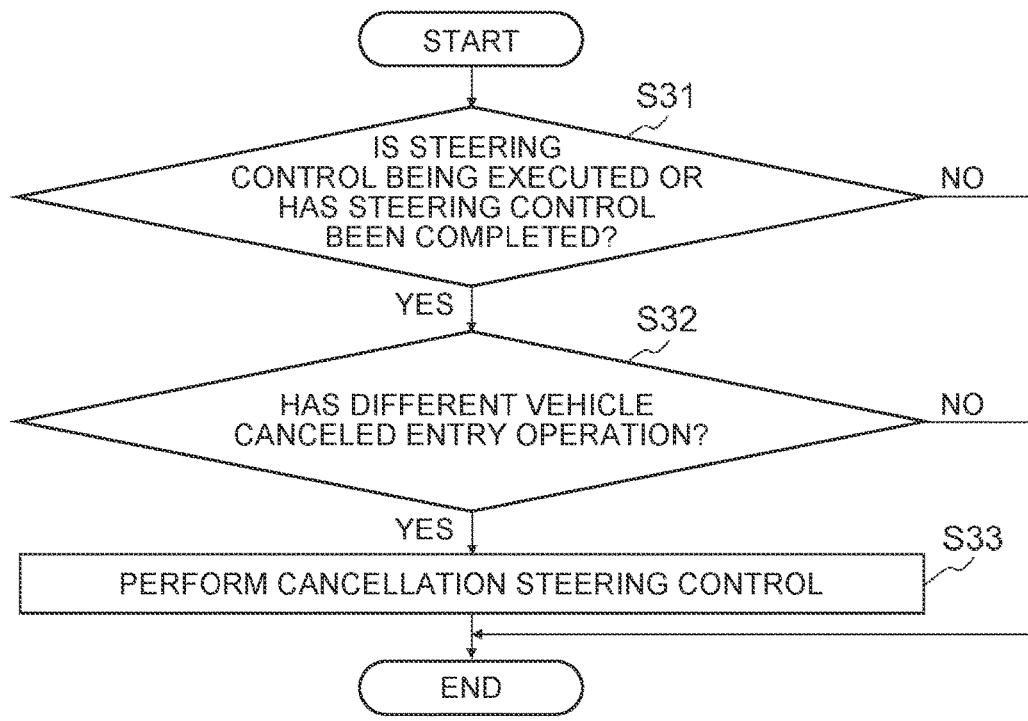
FIG. 13 is a flowchart illustrating processes of the cancellation steering control performed by an ECU 100 according to the third embodiment of the present disclosure.

FIG. 13 is a flowchart illustrating the flow of processes according to the third embodiment. The processes in the present flowchart are repeatedly executed by the ECU 100 at predetermined intervals. In step S31, the steering control unit 107 determines whether the steering control is being executed or has been completed. When the steering control is not being executed or has not been completed (step S31: No), the process is ended. When the steering control is being executed or has been completed (step S31: Yes), determination is made in step S32 whether the different vehicle 2 has canceled the entry operation. When the entry operation has not been canceled (step S32: No), the process is ended. When the entry operation has been canceled (step S32: Yes), the steering control unit 107 performs the cancellation steering control in step S33.

In the third embodiment described above, when entry operation of the different vehicle 2 to enter the adjacent lane L2 is canceled, cancellation steering control is executed such that the travel position of the host vehicle 1 is returned to the original position. Thus, it is possible to avoid the occupants having a sense of insecurity as the host vehicle 1 continues traveling off the original target travel trajectory even though the entry operation has been canceled.

Fourth Embodiment

A fourth embodiment is characterized by updating the prediction of the longitudinal positions and the lateral positions of the host vehicle 1 and the different vehicle 2 during entry operation of the different vehicle 2 to enter the adjacent lane L2 and performing the cancellation steering control when the longitudinal positions and the lateral positions are no longer included in the predetermined control continuation area. Elements that are similar or equivalent to those according to the first to third embodiments are denoted by like signs to omit redundant description.

Figure 14:
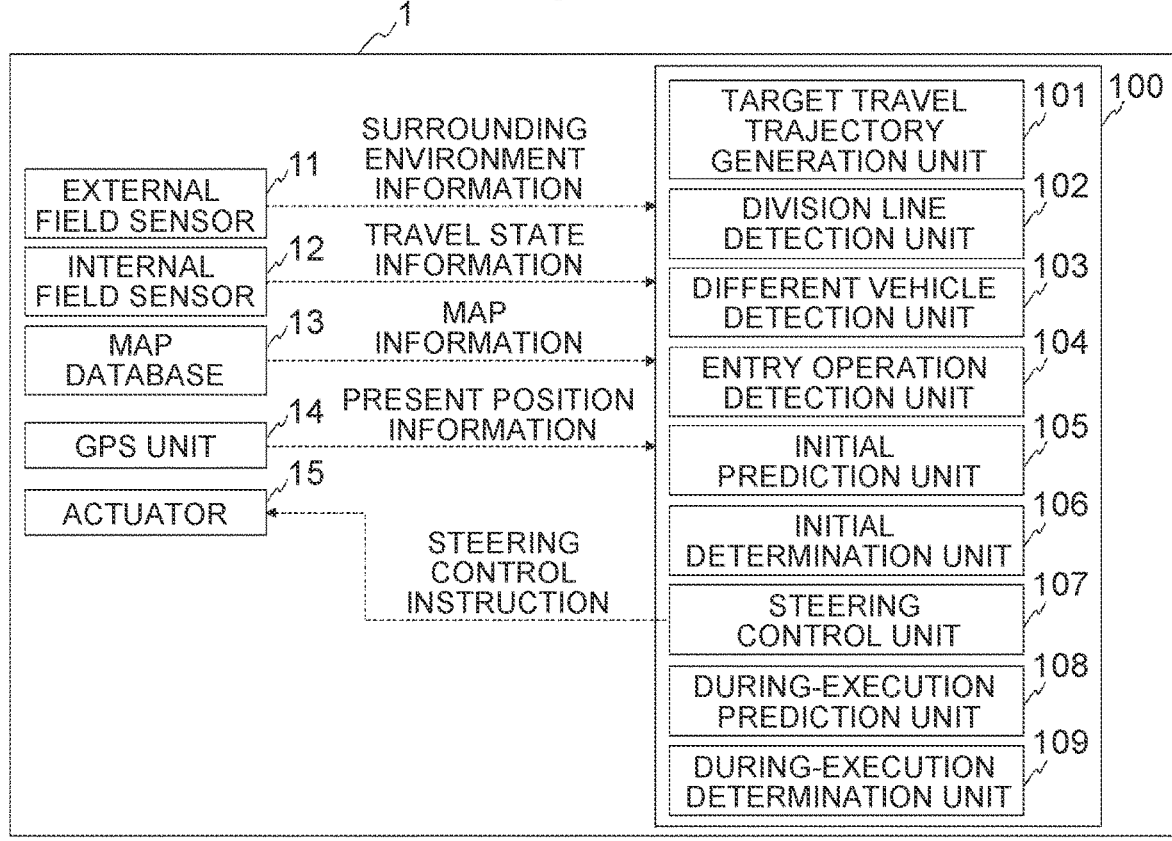
FIG. 14 is a block diagram illustrating the configuration of a host vehicle 1 according to a fourth embodiment of the present disclosure.

As illustrated in FIG. 14, the ECU 100 according to the fourth embodiment includes a during-execution prediction unit 108 and a during-execution determination unit 109.

In the fourth embodiment, the during-execution prediction unit 108 predicts a longitudinal position and a lateral position of the different vehicle 2 with respect to the host vehicle 1 at the time of completion of the entry operation, at the time when the steering control unit 107 is executing the steering control or has completed the steering control. The method of prediction may be the same as the prediction by the initial prediction unit 105. The during-execution determination unit 109 determines whether the longitudinal position and the lateral position predicted by the during-execution prediction unit 108 are included in a predetermined control continuation area. The control continuation area is a region determined in advance with reference to the position of the host vehicle 1. When the combination of the longitudinal position and the lateral position is included in the control continuation area, the cancellation steering control is not executed. When the combination of the longitudinal position and the lateral position is not included in the control continuation area, on the other hand, the cancellation steering control is executed. The content of the cancellation steering control may be the same as that according to the third embodiment.

The above processes are repeatedly performed at predetermined intervals until the entry operation of the different vehicle 2 is completed. That is, the during-execution predicted position of the different vehicle 2 is repeatedly updated.

The control continuation area may be the same region as the control execution area. Alternatively, the control continuation area may be a region that is larger than the control execution area (a control continuation condition is easily met compared to a control execution condition).

Figure 15:
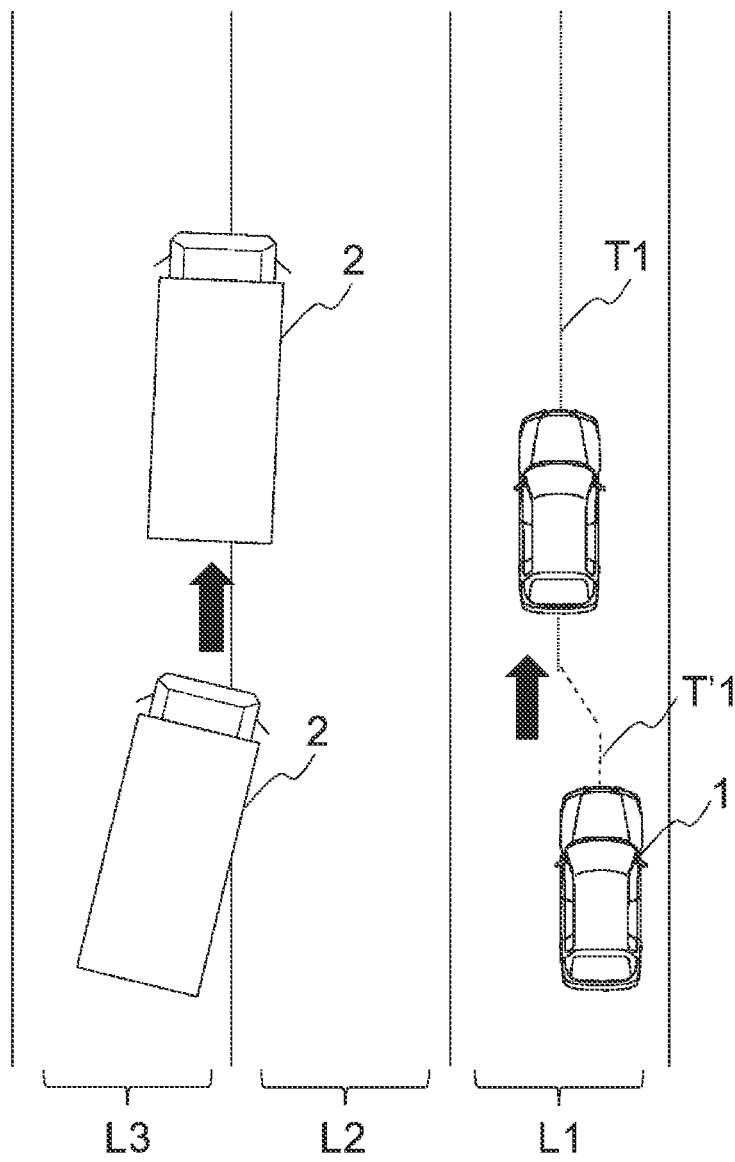
FIG. 15 illustrates a case where cancellation steering control is performed since a combination of the longitudinal position and the lateral position of a different vehicle 2 with respect to a host vehicle 1 at the time of completion of a lane change by the different vehicle 2 is no longer included in a control continuation area in the fourth embodiment of the present disclosure.

FIG. 15 illustrates an example of a scene according to the fourth embodiment. The host vehicle 1 is traveling on the corrected target travel trajectory T'1 based on detecting lane change operation of the different vehicle 2. After that, the behavior of the different vehicle 2 is varied, and the tilt of the different vehicle 2 with respect to the lanes becomes gentle. Accordingly, the longitudinal distance between the host vehicle 1 and the different vehicle 2 at the time of completion of the lane change is increased. Thus, the combination of the longitudinal position and the lateral position predicted by the during-execution prediction unit 108 is not included in the control continuation area, and the cancellation steering control for the host vehicle 1 is executed, and the host vehicle 1 is returned onto the original target travel trajectory T1.

FIG. 16 is a flowchart illustrating the flow of processes according to the fourth embodiment. The processes in the present flowchart are repeatedly executed by the ECU 100 at predetermined intervals until the entry operation of the different vehicle 2 is completed. In step S41, the during-execution prediction unit 108 determines whether the steering control unit 107 is executing or has completed the steering control and the different vehicle 2 is yet to complete the entry operation. When the steering control unit 107 is not executing or has not completed the steering control or the different vehicle 2 is not yet to complete the entry operation (step S41: No), the process is ended. When the steering control unit 107 is executing or has completed the steering control and the different vehicle 2 is yet to complete the entry operation (step S41: Yes), the during-execution prediction unit 108 predicts a longitudinal position and a lateral position of the different vehicle 2 with respect to the host vehicle 1 at the time of completion of the entry operation in step S42. In step S43, the during-execution determination unit 109 determines whether the combination of the longitudinal position and the lateral position predicted is included in the control continuation area. When the combination of the longitudinal position and the lateral position predicted is included in the control continuation area (step S43: Yes), the process is ended. When the combination of the longitudinal position and the lateral position predicted is not included in the control continuation area (step S43: No), the steering control unit 107 executes the cancellation steering control in step S44.

In the fourth embodiment described above, the prediction of the longitudinal position and the lateral position is updated, and the cancellation steering control is executed such that the travel position of the host vehicle 1 is returned to the original position when the longitudinal position and the lateral position are not included in the control continuation area. Thus, it is possible to avoid the occupants having a sense of insecurity as the host vehicle 1 continues traveling off the original target travel trajectory even though it is no longer expected that the host vehicle 1 and the different vehicle 2 approach each other.

Other Embodiments

In the first to fourth embodiments, the ECU 100 may not include the initial prediction unit 105 and the initial determination unit 106. That is, the steering control may be performed when entry operation is detected alone, without predicting longitudinal positions and lateral positions of the host vehicle 1 and the different vehicle 2 at the time of completion of the entry operation. The processes related to the prediction of a longitudinal position and a lateral position require a large amount of processing and may be a factor that increases a load on the ECU 100. When the initial prediction unit 105 and the initial determination unit 106 are not provided, it is possible to suppress the processing load until the steering control is performed after the detection of the entry operation. In addition, the steering control can be started immediately as a part of the processes after the detection of the entry operation is omitted. On the other hand, it is possible to suppress unnecessary steering control when the initial prediction unit 105 and the initial determination unit 106 are provided.

In the first to fourth embodiments, the mobile body located in a region that is not the host vehicle lane L1, of regions that are adjacent to the adjacent lane L2 for the host vehicle lane L1, may not be a different vehicle 2, and may be a different mobile body. Specifically, the mobile body may be a pedestrian, a bicycle, etc.

In the first to fourth embodiments, the steering control unit 107 corrects the target travel trajectory T1, and thereafter performs the steering control so as to move onto the corrected target travel trajectory T' 1. However, the steering control may be performed in a different mode. For example, in a mode in which feedback control is performed so as to follow the center of the travel lane, rather than using a target travel trajectory, the target travel position in the lane may be changed to a position a predetermined distance away from the center of the lane.

In the first to fourth embodiments, a longitudinal position and a lateral position are predicted using the target travel trajectory T1 for the host vehicle 1 and the predicted travel trajectory T2 of the different vehicle 2. However, a longitudinal position and a lateral position may be predicted by a different method. For example, the present longitudinal speeds and lateral speeds of the host vehicle 1 and the different vehicle 2 may be detected, and the longitudinal positions and the lateral positions of the host vehicle 1 and the different vehicle 2 at the time of completion of a lane change may be predicted based on such present longitudinal speeds and lateral speeds. That is, a completion time when a lane change is completed is calculated based on the lateral speed of the different vehicle 2 and the lateral distance of the different vehicle 2 to the adjacent lane L2. After that, the longitudinal positions of the host vehicle 1 and the different vehicle 2 at the completion time are calculated based on the longitudinal speeds of the host vehicle 1 and the different vehicle 2. The lateral position is defined as the distance from the host vehicle 1 to the center of the adjacent lane L2. The longitudinal positions and the lateral positions may be predicted in the manner described above.

In the first to fourth embodiments, it is conceivable that a different vehicle 2 enters each of adjacent lanes on both the right and left sides of the host vehicle 1. For example, it is conceivable that, when there are five or more lanes in the road in which the host vehicle 1 is traveling, a different vehicle 2 makes a lane change from each of second adjacent lanes on the right and left sides of the host vehicle 1 to each of adjacent lanes on the right and left sides of the host vehicle 1. In such a case, the steering control according to the present disclosure may be performed on the different vehicle 2 that started the entry operation earlier. The steering control according to the present disclosure may not be performed when both the different vehicles 2 on the right and left sides started the entry operation at the same time.

The programs related to the present disclosure may be provided as stored in a computer-readable non-transitory storage medium. Examples of the computer-readable storage medium include a magnetic storage medium, an optical storage medium, and a semiconductor memory.

While the first to fourth embodiments and other embodiments of the present disclosure have been described above, the present disclosure is not limited thereto. The present disclosure may be implemented in such embodiments and various forms with a variety of changes and improvements made based on the knowledge of a person skilled in the art.

What is claimed is:

1. A vehicle control device comprising a processor configured to:
    detect a mobile body located in a region that is not a host vehicle lane in which a host vehicle is traveling, out of regions that are adjacent to an adjacent lane that is adjacent to the host vehicle lane;
    detect entry operation of the mobile body to enter the adjacent lane; and
    when the processor detects the entry operation, perform steering control for the host vehicle such that a travel position of the host vehicle within the host vehicle lane in a width direction of the host vehicle lane is moved in a direction away from the adjacent lane before the entry operation is completed.

2. The vehicle control device according to claim 1, wherein the region that is not the host vehicle lane is a lane that is adjacent to the adjacent lane.

3. The vehicle control device according to claim 1, wherein the region that is not the host vehicle lane is a merging path to be merged with the adjacent lane.

4. The vehicle control device according to claim 1, wherein the region that is not the host vehicle lane is an entry and exit path for a facility that faces the adjacent lane.

5. The vehicle control device according to claim 1, wherein the steering control includes correcting a target travel trajectory for the host vehicle in a direction away from the adjacent lane, and moving the host vehicle onto the corrected target travel trajectory.

6. The vehicle control device according to claim 1, wherein the processor is configured to render an amount of movement of the host vehicle in a direction away from the adjacent lane in the steering control larger as a lateral speed of the mobile body in the entry operation is higher.

7. The vehicle control device according to claim 1, wherein:
    the processor is configured to predict an initial predicted position at a time before start of the steering control, the initial predicted position being a predicted position of the mobile body at a time when the entry operation is completed;
    the processor is configured to determine whether the initial predicted position is included in a control execution area determined in advance with reference to a host vehicle position;
    the processor is configured to perform the steering control when the processor has determined that the initial predicted position is included in the control execution area; and
    the processor is configured not to perform the steering control when the processor has determined that the initial predicted position is not included in the control execution area.

8. The vehicle control device according to claim 7, wherein the processor is configured to:
    set a predicted travel trajectory that is a predicted trajectory for travel of the mobile body; and
    predict the initial predicted position based on the predicted travel trajectory and a target travel trajectory for the host vehicle.

9. The vehicle control device according to claim 1, wherein:
    the processor is configured to acquire a size of the mobile body in a lateral direction;
    the processor is configured to determine whether the size in the lateral direction is more than a predetermined threshold;
    the processor is configured to perform the steering control when the processor has determined that the size in the lateral direction is more than the predetermined threshold; and
    the processor is configured not to perform the steering control when the processor has determined that the size in the lateral direction is not more than the predetermined threshold.

10. The vehicle control device according to claim 9, wherein the predetermined threshold is smaller as a lane width of the host vehicle lane is smaller.

11. The vehicle control device according to claim 9, wherein the predetermined threshold is smaller as a lane width of the adjacent lane is smaller.

12. The vehicle control device according to claim 1, wherein the processor is configured to perform cancellation steering control when the entry operation is canceled at a time during execution of the steering control or after completion of the steering control, the cancellation steering control being performed to control steering of the host vehicle such that the travel position of the host vehicle in the width direction of the host vehicle lane is returned to a position before start of the steering control.

13. The vehicle control device according to claim 1, wherein the processor is configured to:
- predict a during-execution predicted position at a time during execution of the steering control or after completion of the steering control, the during-execution predicted position being a predicted position of the mobile body at a time of completion of the entry operation;
- determine whether the during-execution predicted position is included in a control continuation area determined in advance with reference to a host vehicle position; and
- perform cancellation steering control when the processor has determined that the during-execution predicted position is not included in the control continuation area, the cancellation steering control being performed to control steering of the host vehicle such that the travel position of the host vehicle in the width direction of the host vehicle lane is returned to a position before start of the steering control.

14. A vehicle control method executed by a computer, the vehicle control method comprising:
- detecting a mobile body located in a region that is not a host vehicle lane in which a host vehicle is traveling, out of regions that are adjacent to an adjacent lane that is adjacent to the host vehicle lane;
- detecting entry operation of the mobile body to enter the adjacent lane; and
- when the entry operation is detected, performing steering control for the host vehicle such that a travel position of the host vehicle within the host vehicle lane in a width direction of the host vehicle lane is moved in a direction away from the adjacent lane before the entry operation is completed.

15. A non-transitory storage medium storing instructions that are executable by one or more processors and that cause the one or more processors to perform functions comprising:
- detecting a mobile body located in a region that is not a host vehicle lane in which a host vehicle is traveling, out of regions that are adjacent to an adjacent lane that is adjacent to the host vehicle lane;
- detecting entry operation of the mobile body to enter the adjacent lane; and
- when the entry operation is detected, performing steering control for the host vehicle such that a travel position of the host vehicle within the host vehicle lane in a width direction of the host vehicle lane is moved in a direction away from the adjacent lane before the entry operation is completed.

\* \* \* \* \*